S. W. Y. SCHIMONSKY
Car Brake.
No. 81,414.                 Patented Aug. 25, 1868.
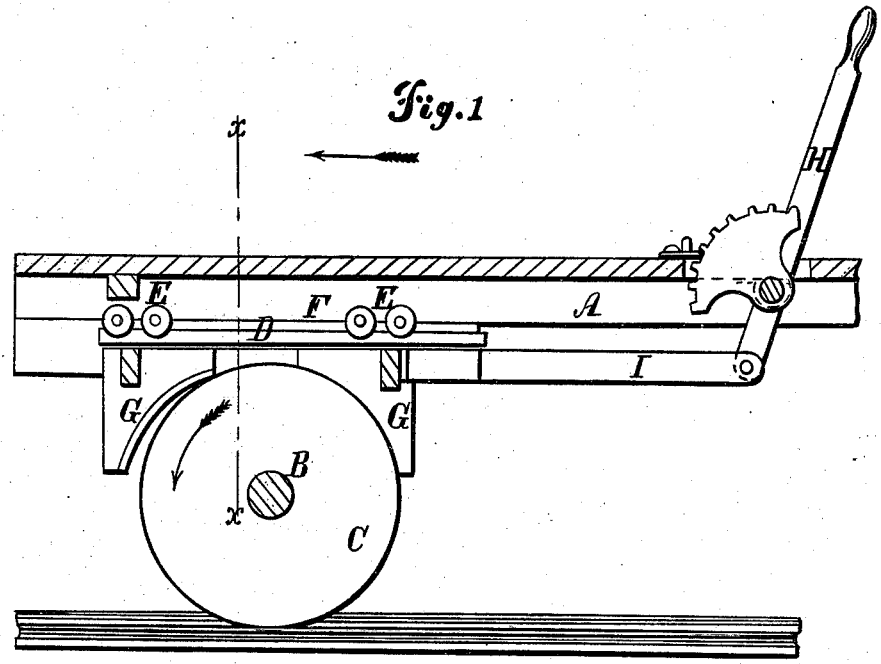
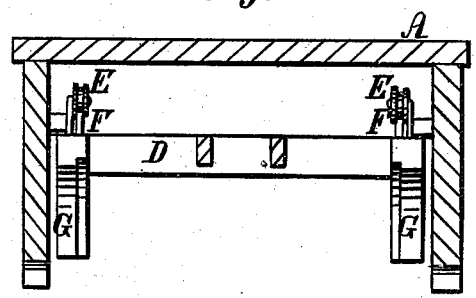

United States Patent Office.

S. W. Y. SCHIMONSKY, OF CHEYENNE, DAKOTA TERRITORY.

Letters Patent No. 81,414, dated August 25, 1868.

IMPROVED CAR-BRAKE.

*The Schedule referred to in these Letters Patent and making part of the same.*

TO ALL WHOM IT MAY CONCERN:

Be it known that I, S. W. Y. SCHIMONSKY, of Cheyenne, in the county of Laramie, and Territory of Dakota, have invented a new and useful Improvement in Car-Brakes; and I do hereby declare that the following is a full, clear, and exact description thereof, which will enable others skilled in the art to make and use the same, reference being had to the accompanying drawings, forming part of this specification, in which—

Figure 1 is a side sectional view of a car-truck having my invention applied to it.

Figure 2 is a transverse vertical section of the same, taken in the line $x\ x$, fig. 1.

Similar letters of reference indicate like parts.

This invention relates to a new and improved brake for railway-cars.

It consists in a novel construction of the same, whereby the principle of the wedge is applied to the shoes, and the brake rendered nearly self-acting and entirely self-locking.

The object of the invention is to obtain a brake which will be efficient in its action, strong, and not liable to get out of repair, and which may be applied with a very slight effort or expenditure of power.

In the accompanying sheet of drawings—

A represents a portion of a car-truck, B one axle thereof, and C one of the wheels thereon. These parts may be of usual construction, and therefore do not require a special description.

D represents a sliding frame, placed in a horizontal position in the truck-frame, above the wheels C, and has wheels, E, attached to it, at each side of its upper part, said wheels running on ways F, secured to the sides of the truck-frame.

To each side of the frame D there are attached two shoes, G G, which are at opposite sides of the wheel.

These shoes are concave at their face sides, forming portions of circles concentric with the wheel, and their concave surfaces are above the axle B, as shown clearly in fig. 1.

The shoes G G of each wheel are placed at such a distance apart that but one of them only can be applied to the wheel at the same time. When one is applied, the other is moved off from the wheel, as shown clearly in fig. 1, and either shoe may be applied by moving the sliding frame D, which is done by a lever, H, the lever-end of which is connected to the frame by a rod, I.

When the car is moving in the direction indicated by the arrow, and it is desired to stop the car, the frame D is moved to bring the shoes G, at the rear side of the wheels, in contact with the same, mere contact being all that is required, for the shoes brought in contact with the wheels will, under the rotation of the latter, become wedged in between the upper parts of the wheels and the ways F, or other suitable fixture, and the wheels become locked effectively.

When the car is moving in the opposite direction, the other shoes G, at the opposite sides of the wheels, are, of course, applied, and, in order to have the shoes at both sides of the wheels free from the latter, the lever H is adjusted in a horizontal position, and retained in that position by a button, $a$, on the platform, which is fitted in a toothed segment, $b$, on the fulcrum-shaft, $c$, of the lever.

It will be readily seen that the brakes of both trucks of a car may be connected without any difficulty, so that they may all be operated simultaneously.

Having thus described my invention, I claim as new, and desire to secure by Letters Patent—

The brake-shoes G, rigidly attached to the frame D, sliding through the wheels E, upon the guides F, and attached to the lever I, all operating as described, whereby the shoes G are alternately wedged upon each side of the wheel, between the same and the guide F, as the lever is operated in either direction, as herein shown and described.

S. W. Y. SCHIMONSKY.

Witnesses:
 FRANK LEE,
 D. E. DANVERS.